United States Patent
King

(10) Patent No.: US 10,760,601 B2
(45) Date of Patent: Sep. 1, 2020

(54) CLAMPING DEVICE

(71) Applicant: Shenton J. King, Fairfield, CT (US)

(72) Inventor: Shenton J. King, Fairfield, CT (US)

( * ) Notice: Subject to any disclaimer, the term of this patent is extended or adjusted under 35 U.S.C. 154(b) by 0 days.

(21) Appl. No.: 16/549,633

(22) Filed: Aug. 23, 2019

(65) Prior Publication Data

US 2020/0063769 A1    Feb. 27, 2020

Related U.S. Application Data

(60) Provisional application No. 62/721,948, filed on Aug. 23, 2018.

(51) Int. Cl.
| | | |
|---|---|---|
| *F16B 2/10* | (2006.01) | |
| *A01K 97/14* | (2006.01) | |
| *B25B 5/16* | (2006.01) | |
| *B25F 1/00* | (2006.01) | |
| *B25B 5/10* | (2006.01) | |
| *B25B 7/04* | (2006.01) | |

(52) U.S. Cl.
CPC .............. *F16B 2/10* (2013.01); *A01K 97/14* (2013.01); *B25B 5/104* (2013.01); *B25B 5/163* (2013.01); *B25B 7/04* (2013.01); *B25F 1/003* (2013.01)

(58) Field of Classification Search
CPC ........... F16B 2/10; A01K 97/14; B25B 5/163; B25B 5/04; B25B 7/04; B25F 1/003
USPC ............... 294/110.1, 110.2, 198, 106, 15, 16
See application file for complete search history.

(56) References Cited

U.S. PATENT DOCUMENTS

| 702,104 | A | * | 6/1902 | Lawrence | |
|---|---|---|---|---|---|
| 886,003 | A | * | 4/1908 | Kraft | |
| 2,378,570 | A | * | 6/1945 | Mitchell | B66C 1/422 294/110.1 |
| 2,718,680 | A | * | 9/1955 | Drill | B22D 29/04 164/407 |
| 2,745,695 | A | * | 5/1956 | Peyer | B66C 1/422 294/118 |
| 2,879,099 | A | * | 3/1959 | Riedesser | B66C 1/38 294/82.32 |
| 3,013,517 | A | * | 12/1961 | Isham | F16B 45/025 294/110.1 |
| 3,051,521 | A | * | 8/1962 | Skowron | B66C 1/422 294/110.1 |

(Continued)

FOREIGN PATENT DOCUMENTS

| CA | 1188097 A | 6/1985 |
|---|---|---|
| DE | 202013009748 U1 | 3/2014 |
| FR | 2840155 A1 | 12/2003 |

OTHER PUBLICATIONS

O&H AG Auto Gaff Fish Grabber. Website.[online]. PriceZen.net [retrieved on Aug. 24, 2018]. Retrieved from the Internet: <URL: www.pricezen.net/product/Auto-Fish-Grabber.html>.

(Continued)

*Primary Examiner* — Paul T Chin

(74) *Attorney, Agent, or Firm* — Murtha Cullina LLP

(57) ABSTRACT

A clamping device, embodiments of which are well suited to securing the tail of a fish, is provided. The device includes one or more clamp arms with actuation bars fixed thereto for causing the clamp arms to pivot when the actuation bars are pushed against an object to be clamped. A locking mechanism locks the clamp arms into the clamped position.

18 Claims, 17 Drawing Sheets

(56) References Cited

U.S. PATENT DOCUMENTS

| | | | |
|---|---|---|---|
| 3,978,605 A * | 9/1976 | Maruniak | A01K 97/14 43/5 |
| 4,005,897 A * | 2/1977 | Smith | A01K 97/14 294/115 |
| 4,563,833 A | 1/1986 | Aucoin | |
| 4,598,492 A | 7/1986 | Stanfield | |
| 4,663,806 A | 5/1987 | Mangum | |
| 4,783,926 A | 11/1988 | McKinney et al. | |
| 4,845,876 A | 7/1989 | Dodson | |
| 4,854,626 A * | 8/1989 | Duke | A01K 97/14 294/104 |
| 4,934,089 A | 6/1990 | Samar | |
| 5,174,057 A | 12/1992 | Sienel | |
| 6,079,141 A | 6/2000 | Washecka | |
| 6,508,496 B1 * | 1/2003 | Huang | E01H 1/12 294/115 |
| 6,571,505 B1 | 6/2003 | Poiencot, Jr. | |
| 6,857,217 B1 | 2/2005 | Herbst et al. | |
| 8,015,676 B1 | 9/2011 | Choate | |
| 8,813,414 B2 | 8/2014 | Jones et al. | |
| 9,032,595 B2 | 5/2015 | Lin | |
| 9,096,298 B1 | 8/2015 | Alvarez | |
| 9,357,758 B1 | 6/2016 | Smith | |
| 9,675,058 B2 | 6/2017 | Brown | |
| 10,015,954 B2 | 7/2018 | Callingham | |
| 2006/0214444 A1 * | 9/2006 | Raney | B66C 1/422 294/110.1 |
| 2017/0114824 A1 | 4/2017 | Henn et al. | |

OTHER PUBLICATIONS

The Flying Tail Cuff. Website. [online]. Jay Jigs Custom Rod & Tackle [retrieved on Aug. 21, 20189. Retrieved from the Internet: <URL: www.jayjigs.com/flying-tail-cuff.html>.

* cited by examiner

CLAMPING DEVICE

CROSS REFERENCE TO RELATED APPLICATIONS

This application claims priority to U.S. Provisional Application Ser. No. 62/721,948, filed Aug. 23, 2018, the entirety of which is incorporated herein by reference.

FIELD

The present technology relates to clamping devices. More particularly, the present technology relates to, in some embodiments, devices for clamping a fishtail to assist with safe handling of the fish.

BACKGROUND

For both private and commercial fishing operations, the primary method of immobilizing fish that have been hooked, but that are too large to land with a net or that have an excess of energy, is to use a gaff hook or tail-rope to secure the fish. These methods pose significant risks of injury to people and damage to the equipment involved. By way of example and without limiting the technology, certain species of relatively large fish, such as sharks, tuna, and swordfish, can be difficult to immobilize and often require tools like gaffs and ropes to immobilize the tail or to inflict sufficient injury to the fish such that the fish loses its ability to fight.

Personal injury or equipment damage is a major concern. When large fish are "green" and still loaded with energy, they can damage the boat, or injure a person attempting to land the fish if brought up too soon. One method of dealing with a "green" fish is to create distance between you and the fish by letting the fish swim away with the hook in its mouth, forcing it to expend more energy in multiple rounds of fighting. Unfortunately, this also presents a risk of losing the fish. The longer the fish is in the water, the higher the chance of losing the fish with a split hook, propeller or rudder entanglement, or tangled lines.

One common practice is to gaff hook and then rope (lasso) the fish during the erratic and dangerous display of tail flapping. In some cases, a metal pole with a wire rope arranged in an open lasso position is used. The user is required to maneuver the device around the fish tail (assuming that the fish is not spooked or the target missed during the erratic thrashing). Almost immediately after lassoing, the user is required to cinch the wire rope tight around the base of the fish tail and turn the pole to release the tightened lasso. This is a three-step process that does not resolve the dangers and difficulties of immobilizing fish with lots of energy left or while in rough waters.

Further, existing gaff technology is often harmful to the fish. A hook is stabbed into the fish, which shocks the fish into erratic behavior from rapidly released adrenaline, pain, and blood loss. Not only does the hook damage the meat, it also initiates the release of adrenaline, which also has a negative effect on the taste of the meat.

Gaff hooks also present significant danger to the anglers on the boat, who are handling the extremely sharp 4-8" hook on a listing boat and slippery deck in a possibly rough seas. Many human injuries occur from this activity. Additionally, the hook can damage the boat while the fish remains at the side of the boat thrashing around and hitting the boat with the large heavy hook now lodged in its body.

A "tail cuff" can be described as an existing gaff hook modified to include two spring loaded metal gates that trap the fish tail, preventing the fish from escaping. The tail cuff presents difficulties for the user, though, because it requires a tricky two step motion: (1) down to position the cuff under the tail, and (2) up, ripping it up to land on the narrowest spot of the tail. A difficult feat in calm seas and with a tired fish, never mind rough seas and a green fish thrashing around. The tail cuff is also often too narrow for many fishtails, such as mako sharks, thresher sharks, swordfish, and generally any other larger variety of fish. Even in cases when the tail fits, with a large tail enclosed the gates are pinned in the open position—preventing the gates from returning to the locked and closed position, rendering the device useless and risking the fish maneuvering out of the device. Without complete gate closure, the device does not immobilize the fish. To release a large tail that does somehow fit, the arms would need to pass back through the fishtail in order to release the device from the tail—resulting in an angler needing to cut the tail off to remove the device for larger fish.

What is needed, therefore, is a device for clamping the tail of a fish that involves a simple engagement motion that can consistently be executed under a variety of conditions. What is also needed is a device for clamping the tail of a fish that can be easily disengaged. What is further needed is a device for clamping the tail of a fish that can safely accommodate fish tails of a variety of sizes.

SUMMARY

Embodiments of the present technology at least partially address these needs by providing, in one embodiment, a clamping device, comprising: a first clamp arm, comprising a first actuation bar and pivotable about a first pivot point and; a second clamp arm, positioned opposite the first clamp arm, and comprising a second actuation bar and pivotable about a second pivot point; and a base, relative to which the first and second clamp arms are adapted to pivot about the first and second pivot points, respectively, and that comprises at least a portion of a locking mechanism adapted to substantially restrict the first clamp arm to pivoting in a first pivot direction and to substantially restrict the second clamp arm to pivoting in a second pivot direction. In some embodiments, the first actuation bar is disposed between the first and second clamp arms and is adapted such that a force applied to the first actuation bar having at least a component in the first pivot direction causes the first clamp arm to pivot in the first pivot direction. In some embodiments, the second actuation bar is disposed between the first and second clamp arms and is adapted such that a force applied to the second actuation bar having at least a component in the second pivot direction causes the second clamp arm to pivot in the second pivot direction. In some embodiments, the first clamp arm and the second clamp arm are pivotable independently of each other relative to the base.

In some embodiments, the first and second clamp arms comprise an open position and define a clamping area between them, and wherein the first and second actuation bars each extend across substantially the entire clamping area.

In some embodiments, the device further comprises a frame to which the first and second clamp arms are pivotably mounted at the first and second pivot points respectively, and to which the base is slidably mounted such that the base is able to slide relative to the frame and the first and second clamp arms.

In some embodiments, the locking mechanism comprises a first ratcheting system between the base and the first clamp arm and a second ratcheting system between the base and the second clamp arm.

In some embodiments, the first ratcheting system comprises a first ratcheting surface on the base and a corresponding first pawl surface on the first clamp arm and the second ratcheting system comprises a second ratcheting surface on the base and a corresponding second pawl surface on the second clamp arm.

In some embodiments, the device further comprises at least one spring biasing the base against the first and second clamp arms, wherein the spring is disposed and exerts a force between the frame and the base.

In some embodiments, the device further comprises a first clamp spring adapted to bias the first clamp arm in the open position and a second clamp spring adapted to bias the second clamp arm in the open position.

According to another embodiment of the technology, a clamping device is provided that comprises: a first clamp arm, comprising a first actuation bar and adapted to pivot about a first pivot point; a second clamp arm, comprising a second actuation bar and adapted to pivot about a second pivot point, and disposed opposite the first clamp arm such that the first and second clamp arms define a clamping area between them; and a base, relative to which the first and second clamp arms are adapted to pivot, and comprising at least a portion of a first locking mechanism adapted to substantially restrict the pivoting of the first clamp arm to a first pivot direction when the base is in an engaged position and at least a portion of a second locking mechanism adapted to substantially restrict the pivoting of the second clamp arm to a second pivot direction when the base is in the engaged position. In some embodiments, the first actuation bar is fixed relative to the first clamp arm such that a force on the first actuation bar having at least a component in the first pivot direction causes the first clamp arm to pivot in the first pivot direction. In some embodiments, the second actuation bar is fixed relative to the second clamp arm such that a force on the second actuation bar having at least a component in the second pivot direction causes the second clamp arm to pivot in the second pivot direction. In some embodiments, the first and second clamp arms have an open position in which the first and second actuation bars extend across substantially the entire clamping area between the clamp arms.

In some embodiments, the first pivot point is different from the second pivot point.

In some embodiments, the first clamp arm and the second clamp arm are adapted to pivot independently of each other.

In some embodiments, the first locking mechanism is a ratcheting system comprising a first ratchet surface on the base and a corresponding first pawl surface on the first clamp arm; and the second locking mechanism is a ratcheting system comprising a second ratchet surface on the base and a corresponding second pawl surface on the second clamp arm.

In some embodiments, the device further comprises a frame, comprising: a first mounting point to which the first clamp arm is pivotably mounted; a second mounting point to which the second clamp arm is pivotably mounted; and at least one third mounting point to which the base slideably mounted.

In some embodiments, the device further comprises: a first spring that biases the first clamp arm in an open position; a second spring that biases the second clamp arm in an open position; and at least one third spring that biases the base into the engaged position.

In some embodiments, the frame further comprises a stock portion adapted for mounting on a pole.

According to another embodiment, a clamping device is provided, comprising: a first clamp arm, comprising a first actuation bar and pivotable about a first pivot point; a second clamp arm, positioned opposite the first clamp arm, and comprising a second actuation bar and pivotable about a second pivot point; and a base, relative to which the first and second clamp arms are adapted to pivot about the first and second pivot points, respectively, and that comprises at least a portion of a locking mechanism adapted to substantially restrict the first clamp arm to pivoting in a first pivot direction and to substantially restrict the second clamp arm to pivoting in a second pivot direction. In some embodiments, the first actuation bar is fixed with respect to the first clamp arm, is disposed between the first and second clamp arms, and is adapted such that a force applied to the first actuation bar having at least a component in the first pivot direction causes the first clamp arm to pivot in the first pivot direction; In some embodiments, the second actuation bar is fixed with respect to the second clamp arm, is disposed between the first and second clamp arms, and is adapted such that a force applied to the second actuation bar having at least a component in the second pivot direction causes the second clamp arm to pivot in the second pivot direction. In some embodiments, the first clamp arm and the second clamp arm are pivotable independently of each other relative to the base. In some embodiments, the first and second clamp arm have an open position in which the first actuation bar and the second actuation bar extend across substantially the entire clamping area between the clamp arms.

In some embodiments, the device further comprises a frame, comprising: a first mounting point to which the first clamp arm is pivotably mounted; a second mounting point to which the second clamp arm is pivotably mounted; and at least one third mounting point to which the base slideably mounted.

In some embodiments, the locking mechanism includes a first ratcheting system between the base and the first clamp arm and a second ratcheting system between the base and the second clamp arm; and the first ratcheting system comprises a first ratcheting surface on the base and a corresponding first pawl surface on the first clamp arm and the second ratcheting system comprises a second ratcheting surface on the base and a corresponding first pawl surface on the second clamp arm.

In some embodiments, the device further comprises a first spring that biases the first clamp arm in an open position; a second spring that biases the second clamp arm in an open position; and at least one third spring that biases the base into the engaged position.

Some embodiments of the present technology provide a clamping device that will clamp an object as a result of a single downward motion of the device. When used to secure the tail of the fish, clamping arms according to some embodiments of the device pass over the tail and simultaneously close around the tail without injuring the fish, damaging the meat, or startling the fish, and also lock in place using a locking mechanism. Once the clamping action is complete, in some embodiments, the user pulls the pole up and away from the fish, leaving a clinched fishtail connected to a rope on the device (in embodiments in which a rope is provided. Such a rope may then be connected to a boat cleat, rendering the fish completely immobile and unharmed.

Some embodiments of this technology provide a more effective, safer, and more efficient way to immobilize a fish, especially when the intention is not to kill or fatally injure the fish. Some embodiments of the technology provide a simple and effective way to clamp other objects. Some embodiments of this technology provide an improvement over other non-lethal tools for immobilizing fish.

Additional details about embodiments of the technology will not be described in connection with attached drawings.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Embodiments of the present technology relate to devices for clamping objects. Some embodiments permit the use of a single top-down motion, as opposed to a bottom-up motion, to securely clamp on to the object. This simple, top-down motion greatly simplifies the act of securing an object in environments in which the platform from which a user is attempting to secure the object is shifting, unsteady, or where there is significant movement between the user and the object to be clamped. In some embodiments, this involves immobilizing the tail of a fish by clamping a device according to an embodiment of the technology onto the fish tail. Although many embodiments of the technology are particularly helpful for clamping the tail of the fish, many embodiments of the technology are useful for clamping objects of a variety of types, especially floating or partially submerged objects that need to be secured by a user on an adjacent boat.

Figure 1:
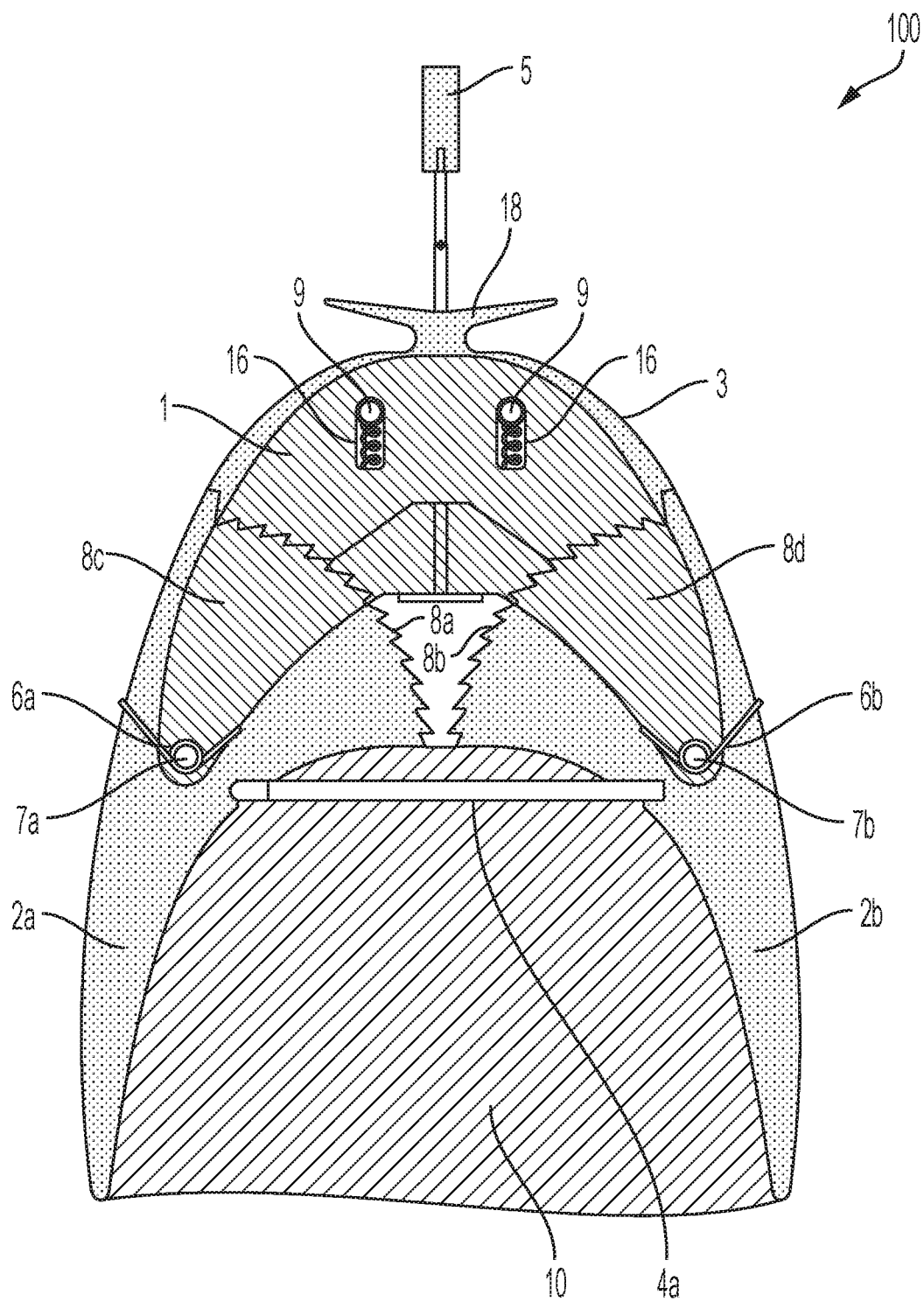
FIG. 1 shows a top view of a first embodiment of the technology.
Figure 2:
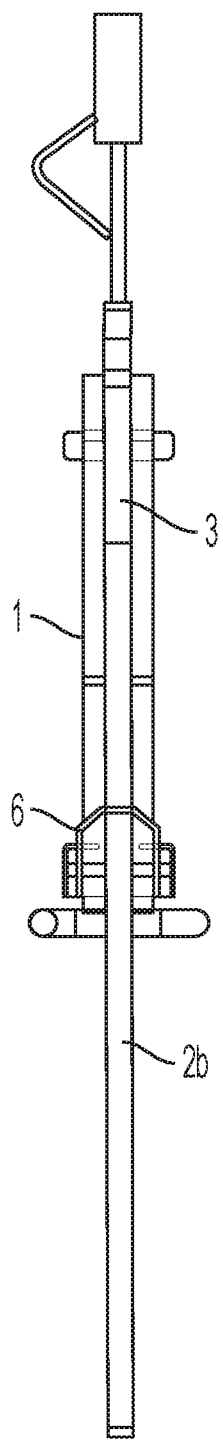
FIG. 2 shows a side view of the embodiment of FIG. 1.

FIG. 1 shows a first embodiment of the technology in the form of a clamping device 100. The device 100 comprises a first clamp arm 2a and a second clamp arm 2b. Clamp arms 2 are sometimes referred to as "claws." Each clamp arm comprises, in this embodiment, an actuation bar 4a, 4b, and each clamp arm is pivotable about a separate pivot point located at 7a and 7b in this embodiment. In some embodiments, the clamp arms 2 are shaped such that they each pivot about a single, shared pivot point. In FIG. 1, the clamp arms are shown in an open position.

The clamp arms are positioned opposite to each other and form a clamping area 10 between them. The clamp arms are positioned and sized so that the clamping area is sized appropriately to receive the object to be clamped—in some embodiments, the tail region of a fish.

Clamping device 100, in this embodiment, further comprises a base 3 (sometimes referred to as a "stopper"). In this embodiment, the clamp arms 2 pivot relative to the base 3, and the base comprises at least a portion of a locking mechanism 8. The locking mechanism 8 is adapted to substantially restrict the clamp arms to pivoting in a single, selected direction. The selected pivoting directions are indicated by the arrows 14 and 15 in FIG. 4. In some embodiments, only one of the clamp arms is able to pivot, while the clamp arm on the opposite side of the clamping area has a fixed position.

The first and second actuation bars 4a and 4b are arranged so as to be disposed between the clamp arms 2a and 2b. In this embodiment, the actuation bars are fixed relative to their respective clamp arms, i.e., the first actuation bar 4a is attached to the clamp arm 2a such that the actuation bar does not move relative to the clamp arm 2a, and the second actuation bar 4b is attached to the clamp arm 2b such that the actuation bar does not move relative to the clamp arm 2b. Thus, when a force is applied to the first actuation bar 4a that has at least a component in the direction in which the clamp arm 2a is able to pivot, such a force causes the clamp arm to pivot in that pivot direction. Likewise, when a force is applied to the second actuation bar 4b that has at least a component in the direction in which the clamp arm 2b is able to pivot, such a force causes the clamp arm to pivot in that pivot direction.

Figure 4:
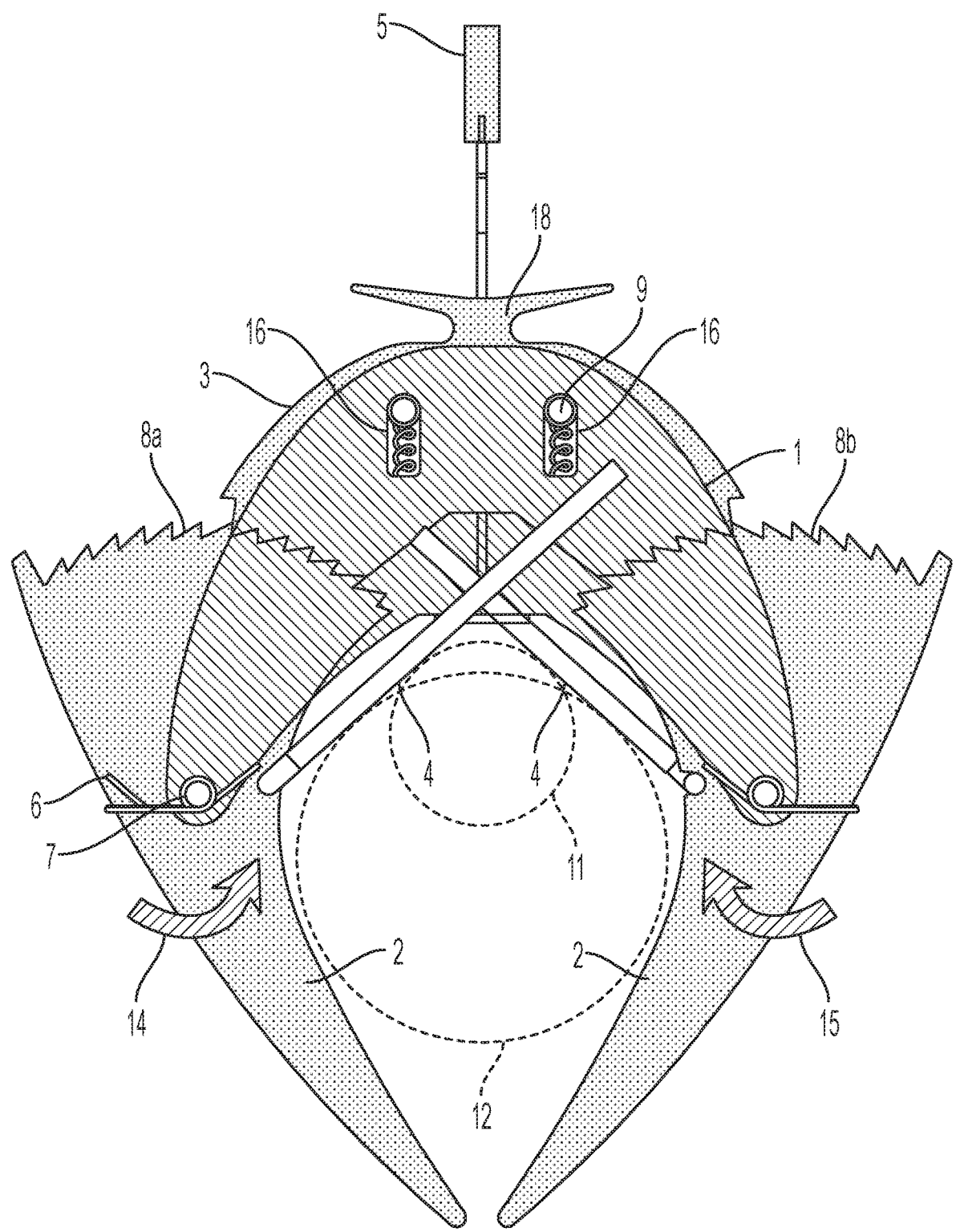
FIG. 4 shows a top view of the embodiment of FIG. 1 in a clamped state.

FIG. 4 shows the device 100 in a clamped, or closed, position in which both clamp arms 2a and 2b have been pivoted from their open positions. This view shows the closed position that results from driving the device onto an object oriented roughly in line with the center of the device. In such a case, both actuation bars 4a and 4b are acted upon by essentially equal forces such that the clamp arms 2a and 2b are pivoted by roughly the same amount. The broken lines 11 and 12 show exemplary objects against which the actuation bars 4a and 4b were pushed in order to pivot the clamp arms to the closed position shown.

In the embodiment of FIG. 1, the clamp arms 2a and 2b are pivotable independently of each other relative to the base. In other words, one of the clamp arms 2a or 2b can be pivoted from its open position without the other clamp arm moving at all relative to the base.

Figure 5:
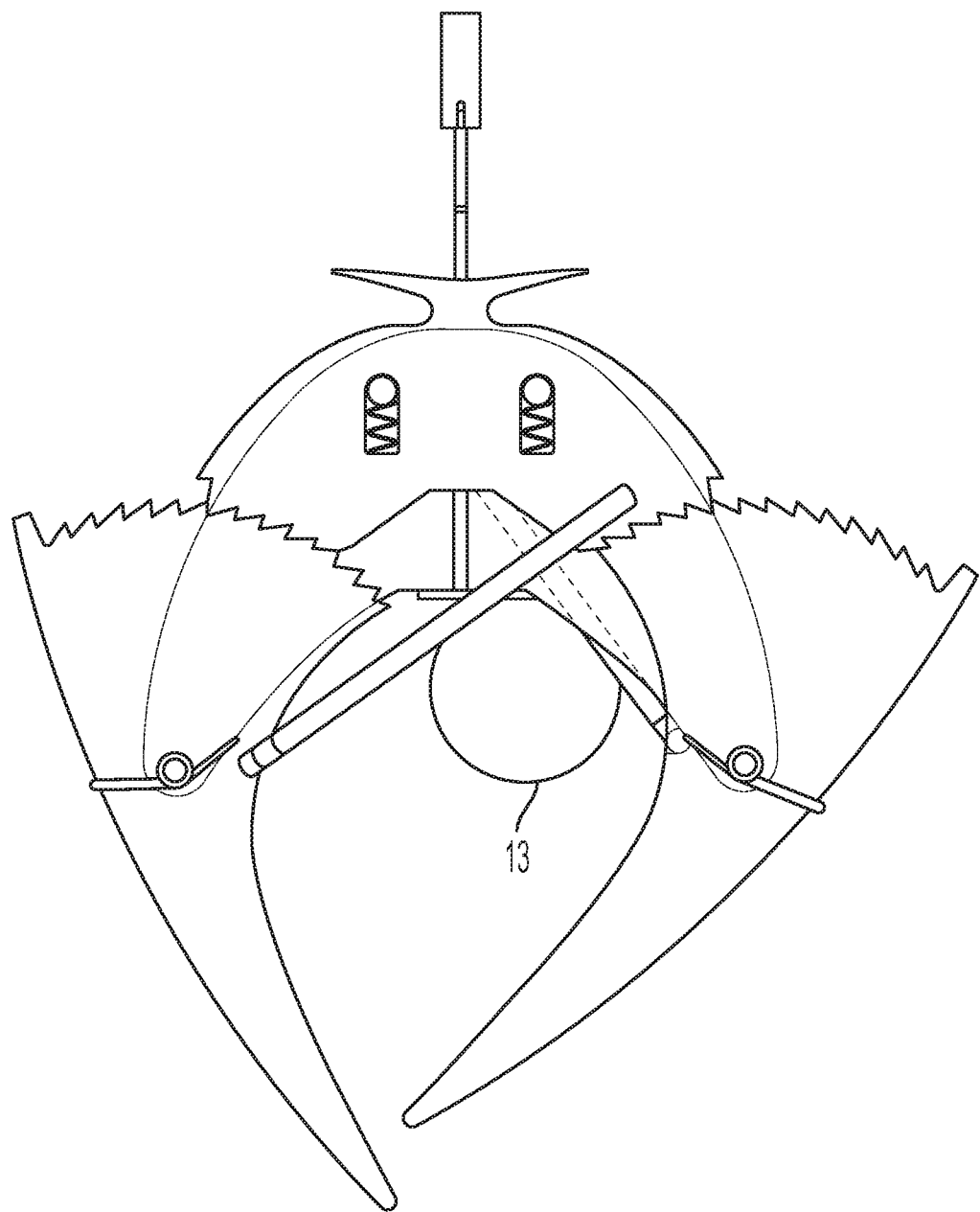
FIG. 5 shows a top view of the embodiment of FIG. 1 in a second clamped state.

FIG. 5 shows the device 100 in a clamped position, but one in which the clamp arms have pivoted different amounts because they can move independently of each other. In FIG. 5, clamp arm 2b has been pivoted to a greater degree than clamp arm 2a. This is the result of clamping down on an object (shown in broken lines 13) that was oriented off-center. As a result, the object 13 pivoted the actuation bar 4b (and therefore the clamp arm 2b) through a greater angle than it pivoted the actuation bar 4a (and therefore clamp arm 2a).

In this embodiment, the feature of the clamp arms being independently pivotable helps enable the device 100 to clamp on to objects that are off center with respect to the device. This feature helps enable use with a much wider margin for error to help accommodate a thrashing fish, rough seas, or any other factor that may be causing the object to be clamped to move relative to the device 100.

Figure 3:
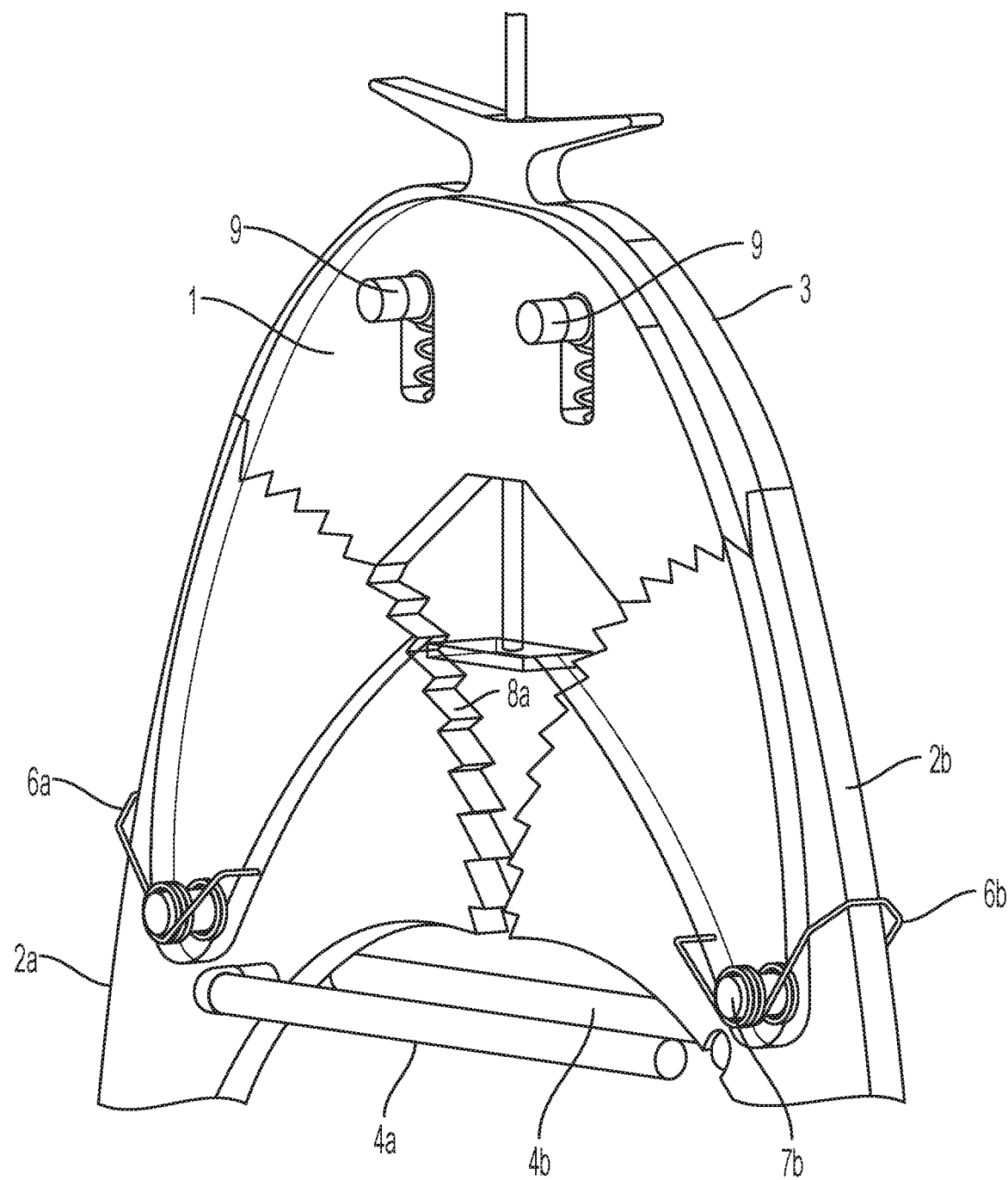
FIG. 3 shows a top perspective view of the embodiment of FIG. 1.

Also as shown in FIGS. 1 and 3, in this embodiment, the first and second actuation bars 4a and 4b each extend across substantially the entire clamping area 10 between the clamp arms. This feature also helps widen the margin of error for off-center objects. As a result of the actuation bars extending across substantially all of the clamping area, no matter where an object makes contact with the device between the clamp arms, it will actuate the closing action of one or both of the clamp arms. As shown in FIGS. 1 and 3, in this embodiment, both actuation bars extend substantially to the opposite clamp arm, and the actuation bars overlap across the entire clamping area. In other embodiments, only one of the actuation bars extends across substantially the entire clamping area, while the other actuation bar is shorter. In such embodiments, the clamp arm with the longer actuation bar will pivot more often and/or through a larger angle than the clamp arm associated with the shorter actuation bar when off-center objects are clamped.

In this embodiment, the closing action of the clamp arms or claws 2 is initiated by the downward motion of the device upon the top of the object to be clamped, such as the tail of a fish.

The embodiment shown in FIGS. 1-5 includes a frame 1, to which the base 3 and the clamp arms 2a, 2b are mounted. In the embodiment shown, the frame is an open fixed fork-type frame. The clamp arms are pivotably mounted to the frame 1 at their respective pivot points. In the embodiment shown, the clamp arms each comprise a circular hole through which a pivot pin 7 extends, connecting each arm to the frame 1. In this embodiment, the actuation bars are designed to pass over the frame 1 as the bars are pivoted and the clamp arms closed.

In the embodiment shown in FIG. 1, the base 3 is slidably mounted to the frame 1. The frame includes pins 9, which run through slots 14 formed in the base 3 (See FIG. 6). The slots 14 allow the base to slide up and down relative to the frame 1 and the first and second clamp arms 2 from an engaged position, in which the base is against the clamp arms 2a and 2b, to a released position.

In the embodiment shown in FIGS. 1-5, the locking mechanism 8 comprises a first ratcheting system between the base 3 and the first clamp arm 2a and a second ratcheting system between the base 3 and the second clamp arm 2b. The ratcheting system 8 comprises opposed teeth in the form of ratcheting surfaces 8c and 8d on the base that correspond to and interact with a first pawl surface 8a on the first clamp arm 2a and a second pawl surface 8b on the second clamp arm 2b. The ratcheting surfaces on the base correspond to the pawl surfaces so that the clamp arms can pivot in the directions indicated by arrows 14 and 15 in FIG. 4. The ratcheting surfaces restrict pivoting of the clamp arms 2 in the directions opposite to the arrows 14 and 15 whenever the locking mechanism is engaged, i.e., whenever the base is engaged against the clamp arms. Other types of locking mechanisms are used in other embodiments.

In the embodiment of FIGS. 1-5, springs 16 are used to bias the base 3 against the clamp arms 2a, 2b. The springs 16 are disposed in the slots 14 of the base and bear against the pins 9 of the frame 1 and the base 3. In this way, the springs 16 are disposed between and exert a force between the frame 1 and the base 3. The spring force bias from springs 16 ensures that the locking mechanism 8 keeps the clamp arms 2a and 2b from moving to their open position unexpectedly.

After one or both of the clamp arms 2a and 2b have been moved to a clamped or closed position, the locking mechanism can be disengaged by pulling on the handle 18 at the top of the base 3. A force that pulls the base 3 upward against the springs 16 will release the ratcheting system.

In this embodiment, two clamp springs 6a and 6b are provided that bias the clamp arms toward an open position. In this embodiment, the springs 6a and 6b do not provide enough force to overcome the force of the ratcheting and pawl surfaces so that unwanted and unexpected movements of the clamp arms are avoided, but the springs 6a and 6b help ensure that the clamp arms will return to their open position when the locking mechanism is released by pulling up on the handle 18.

As shown in FIGS. 1, 2, 4, 5 and 10, the frame 1 comprises a stock 5, which is adapted to have a pole or post, or other type of handle, mounted thereon. This embodiment is connected to an elongated pole via the male cylindrically-shaped stock 5 that slides into a female receiver end of the pole, permitting a user to safely immobilize the fish from a boat. In some embodiments, the stock 5 is differently shaped, such as rectangular or hexagonal. In other embodiments, the stock 5 is female for receiving a male end of a pole. The stock 5 is formed of a metal material in some embodiments, and other materials in other embodiments. The use of a pole or other extended handle improves the usefulness of the device by increasing the reach a user can have with the device.

Figure 6:
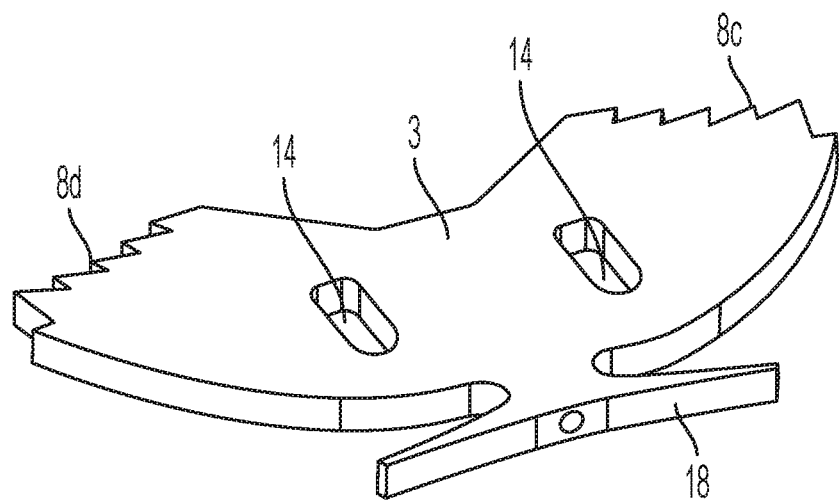
FIG. 6 shows a rear perspective view of a component of the embodiment of FIG. 1.

FIG. 6 shows a perspective view of the base 3 of the embodiment shown in FIG. 1. The base 3 in this embodiment has two slots 14, two ratcheting surfaces 8c and 8d, and a handle 18. In this embodiment, the base 3 is formed of a high density polyethylene, as are other components of this embodiment of the technology. In other embodiments, acrylic, other high strength polymer or composite materials, or metals such as aluminum and/or steel are used for components of the device. Polymer and composite materials are chosen for many embodiments to lengthen the serviceable life of the device, and to help limit damage to a boat's gel-coat finish when the device is used for fishing. In some embodiments, carbon fiber materials and composite materials are used for some or all of the components of the device. The method by which devices according to the present technology are manufactured varies depending on the specifics of the embodiment and the materials used. For example, components of embodiments formed in HDPE and other polymer materials are often molded using appropriate molding techniques. Metal components are often machined or cast.

Figure 7:
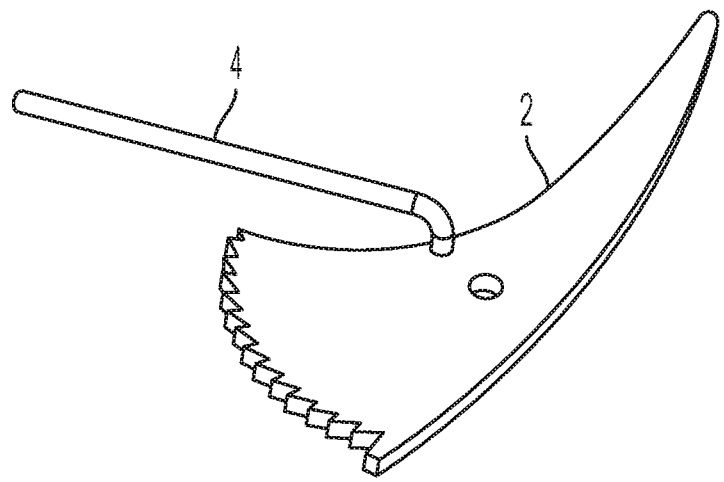
FIG. 7 shows a perspective view of a component of the embodiment of FIG. 1.

FIG. 7 shows a perspective view of a clamp arm 2, which an actuation bar 4 attached. The clamp arm 2 has a circular hole 19 through which a pin is placed to mount the arm to the frame. The circular hole 19, therefore, forms the pivot point about which the arm pivots. Like the base 3, the clamp arm 2 and the actuation bar 4 are formed of aluminum in the embodiment shown, and are formed of stainless steel in other embodiments. The actuation bar 4 is fixedly attached to the arm. In some embodiments, the clamp arms are reversible so that one clamp arm design can be used for both opposing clamp arms.

Figure 8:
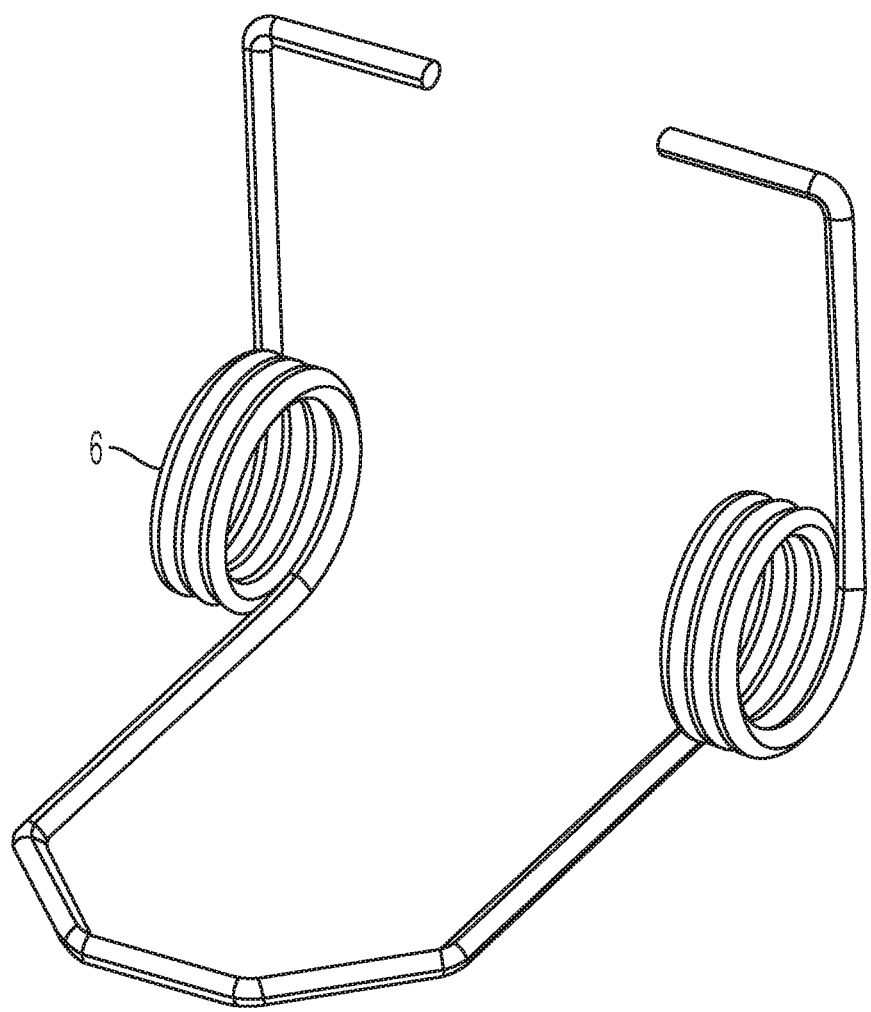
FIG. 8 shows a perspective view of a component of the embodiment of FIG. 1.

FIG. 8 shows a perspective view of a clamp spring 6. In the embodiment shown, the spring is made of stainless steel. In this embodiment, the dimensions of the spring are as follows: wire diameter=0.035 inches, outer diameter of the coil=0.510 inches, inner diameter of the coil=0.440 inches, number of active coils=2.750, length of leg 1=0.900 inches, length of leg 2, 1.400 inches, rate per degree=0.007 In-Lbs/Degree, spring rate per 360 degrees=2.394 In-Lbs/360 Degrees, maximum torque possible=0.835 In-Lbs, maximum safe travel=125.6280 degrees.

Figure 9:
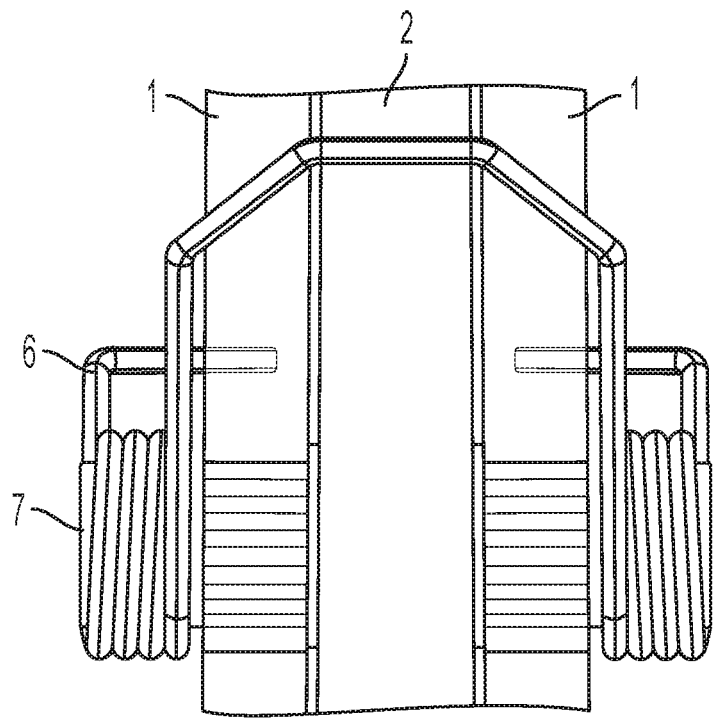
FIG. 9 shows a close-up side view of the embodiment of FIG. 1.
Figure 11:
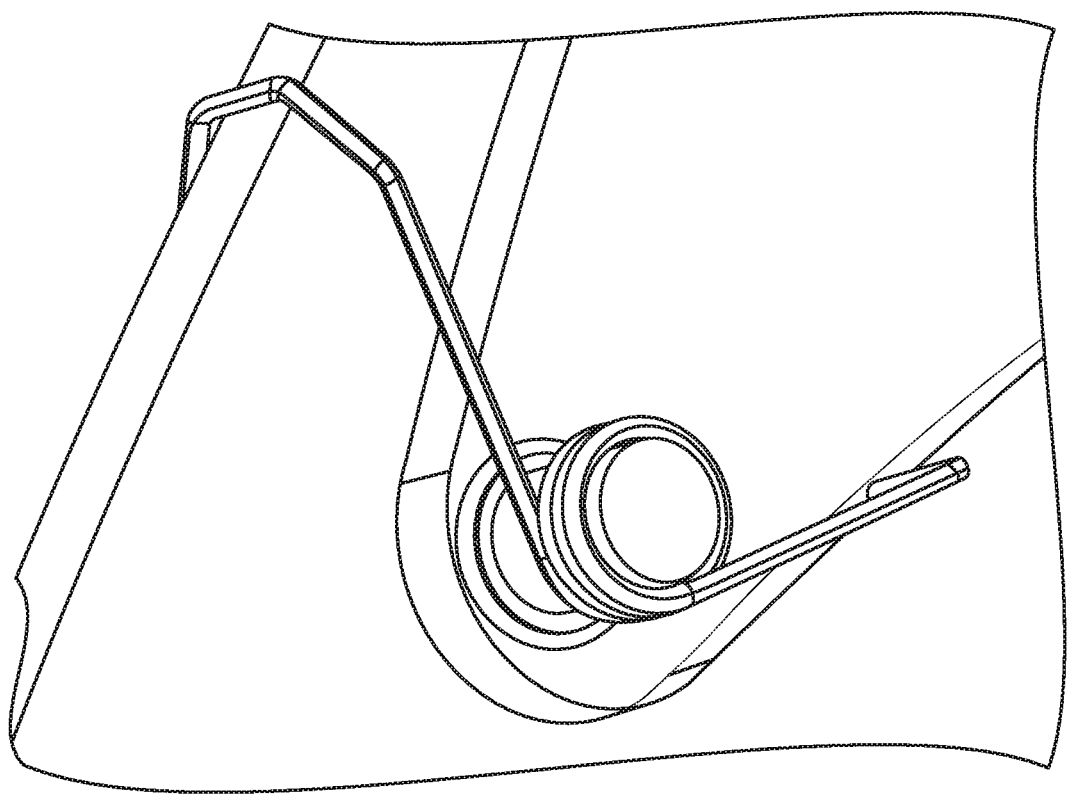
FIG. 11 shows a close-up perspective view of components of the embodiment of FIG. 1.

FIG. 9 shows a close-up side view of the area of the clamping device 100 where a clamp spring is mounted, and FIG. 11 shows a perspective view of this area. The long arm of the clamp spring bears against an edge of the clamp arm position on the outside of the device, while the short arm of the spring 6 bears against an inner edge of the frame 1. This relationship is also shown in FIGS. 1 and 3. This arrangement biases the clamp arms into an open position.

Figure 10:
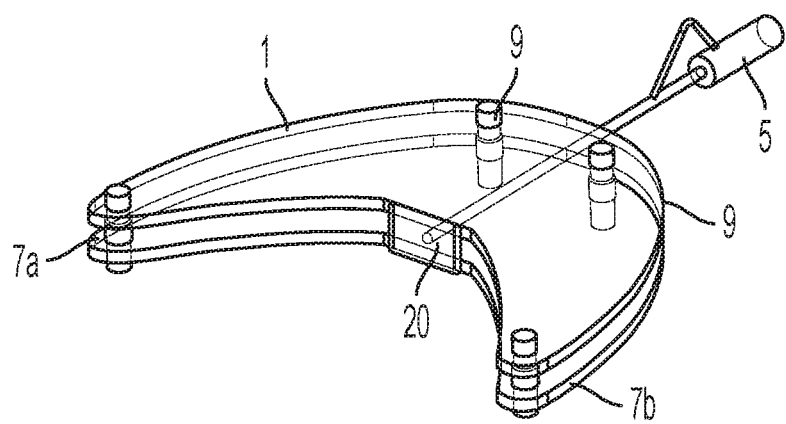
FIG. 10 shows a perspective view of components of the embodiment of FIG. 1.

FIG. 10 shows a perspective view of the frame 1. The frame 1 includes the pins 7a and 7b to which the clamp arms 2 are pivotably mounted, and the pins 9 to which the base 3 is slideably mounted in this embodiment. A plate 20 is shown, which serves as a connection for the stock 5 and to prevent contact between an object to be clamped and the base 3 (not shown in FIG. 10). In this embodiment, the frame is comprised of two separate layers between which the base and clamp arms are disposed.

Figure 12:
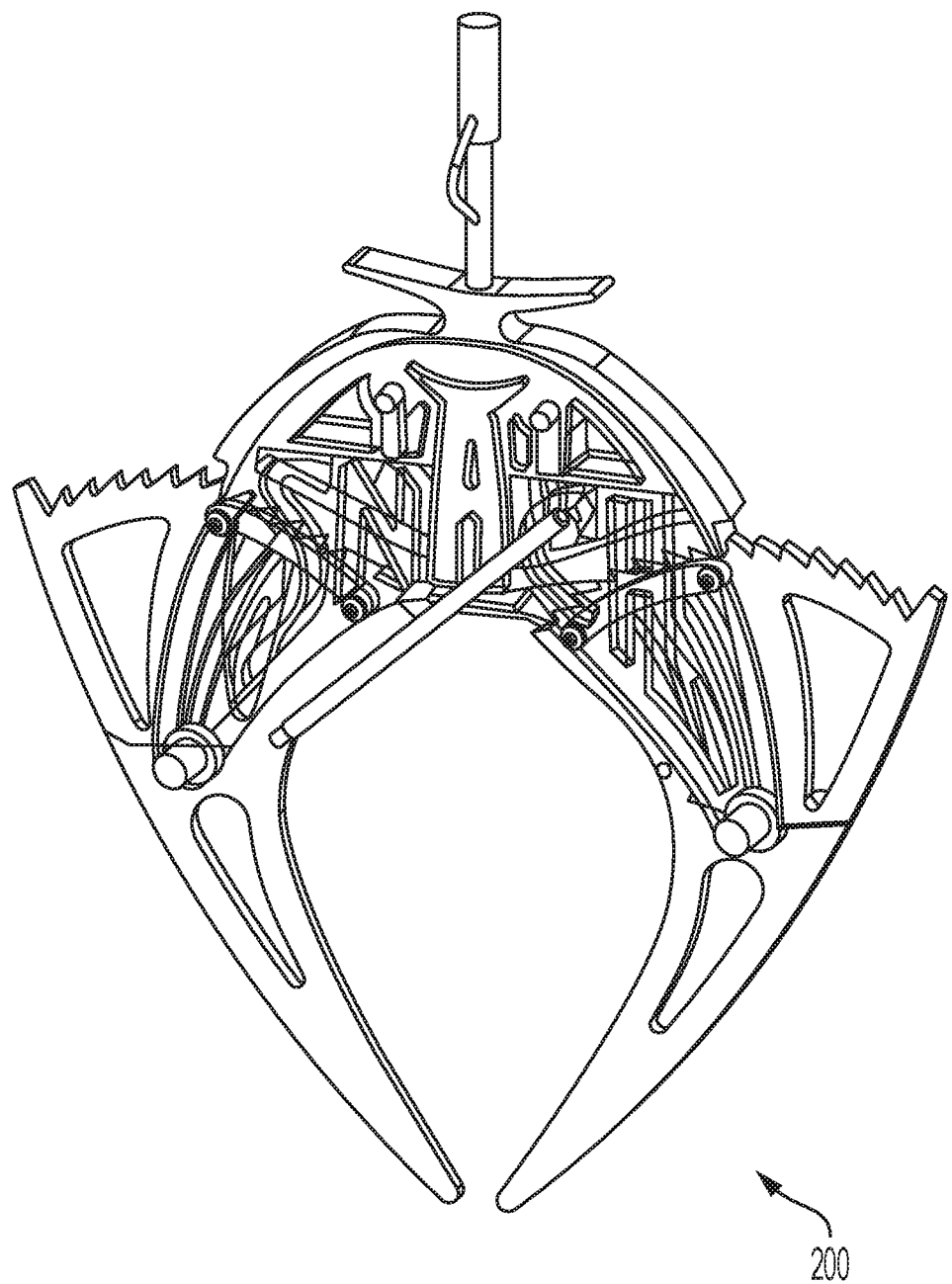
FIG. 12 shows a perspective view of a second embodiment of the present technology.

FIG. 12 shows an alternative embodiment of a clamping device 200 according to the present technology. In this embodiment, the components include selective material eliminations to reduce the weight of the device.

Figure 13:
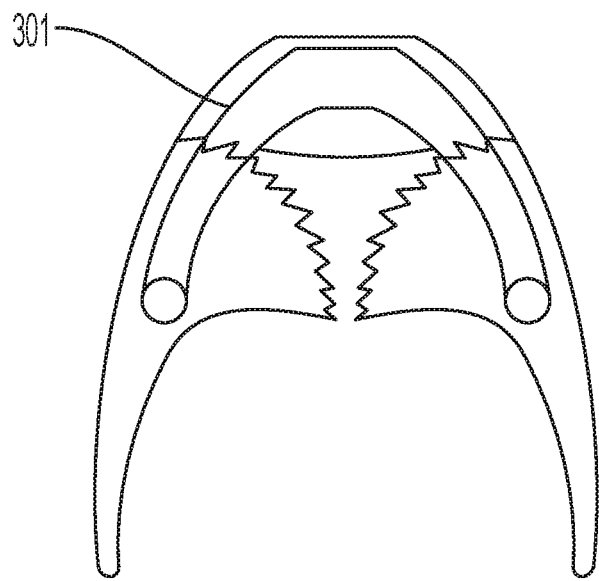
FIG. 13 shows a top view of a component of a third embodiment of the present technology.

FIG. 13 shows an alternative frame component 301. The alternative frame 301 uses less material in some embodiments to reduce weight.

Figure 14:
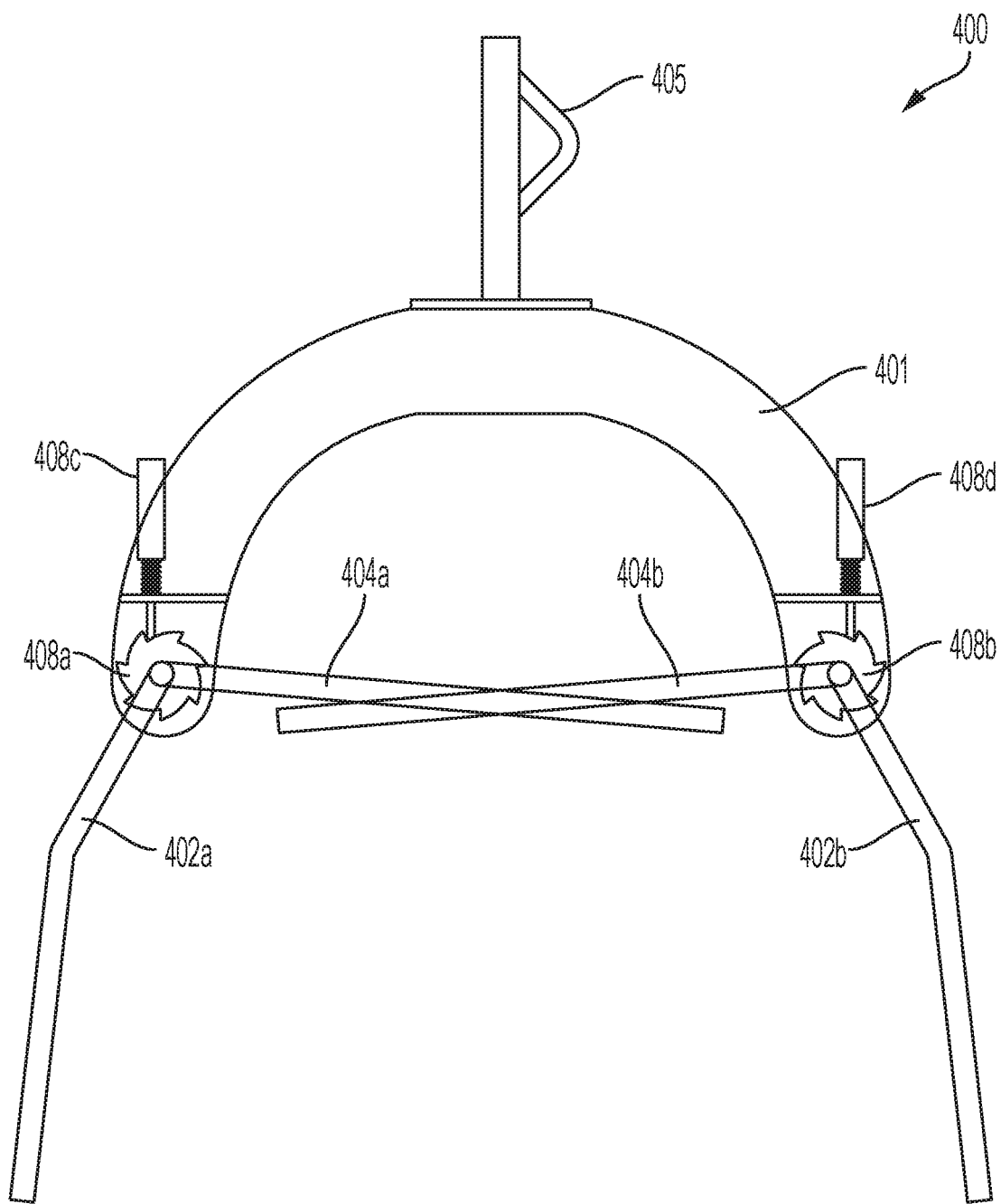
FIG. 14 shows a top view of a fourth embodiment of the present technology.
Figure 15:
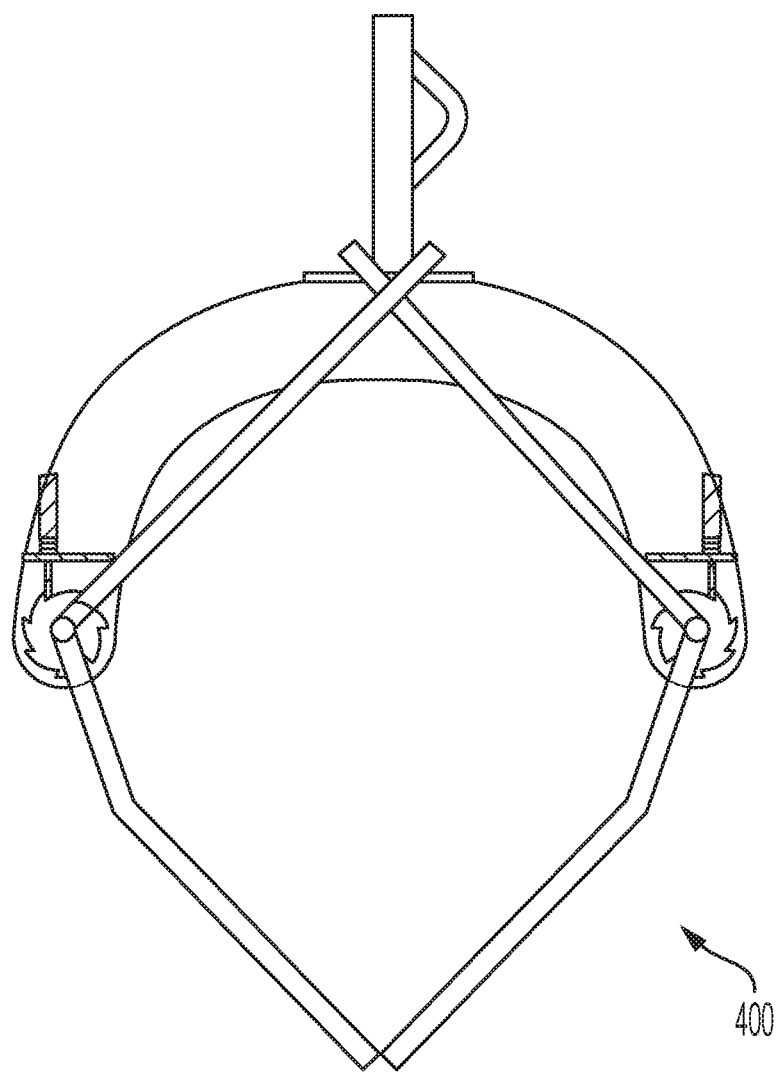
FIG. 15 shows a top view of the embodiment of FIG. 14 in a clamped state.
Figure 16:
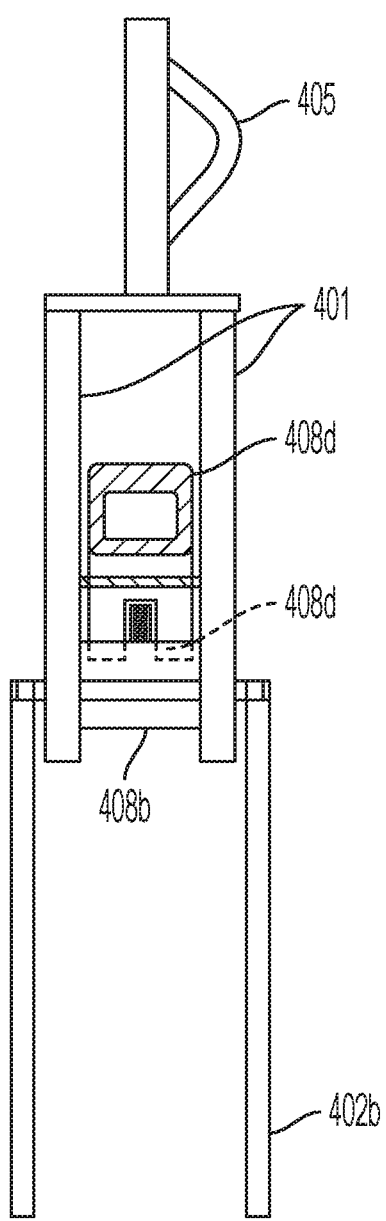
FIG. 16 shows a side view of the embodiment of FIG. 14.

FIGS. 14, 15, and 16 show another alternate embodiment of a device 400 according to the present technology. In this embodiment, the clamp arms 402 and actuation bars 404 are rods attached to a U-shaped frame 401. The locking mechanism in this embodiment comprises ratchets 408a and 408b that interact with pawls 408c and 408d. A stock 405 permits connection to a pole or other handle.

Figure 17:
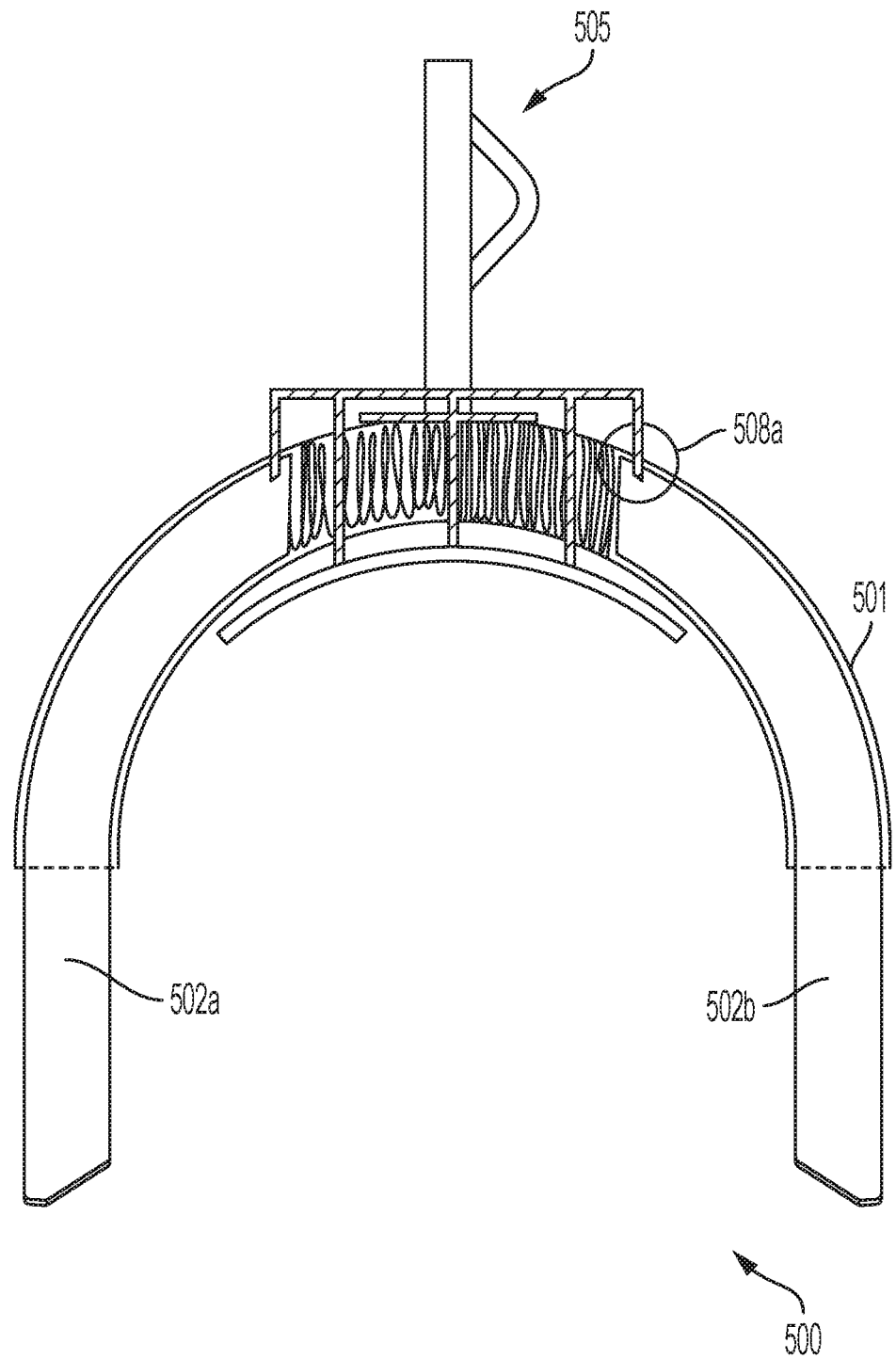
FIG. 17 shows a top view of a fifth embodiment of the present technology.
Figure 18:
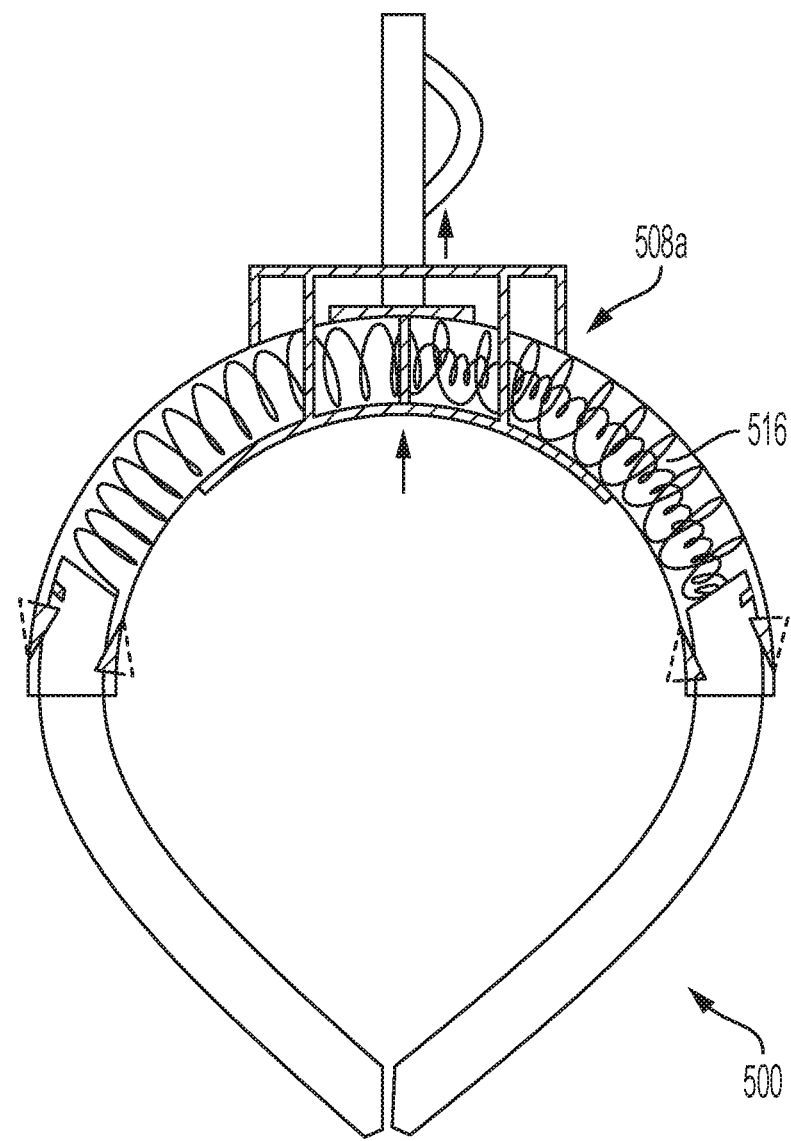
FIG. 18 shows a top view of the embodiment of FIG. 17 in a clamped state.

FIGS. 17 and 18 show another alternate embodiment of a device 500 according to the present technology. In this embodiment a frame 501 holds a spring 506 and two clamp arms 502a and 502b. A force trigger 508a has an arm and a plate inside the device that protrudes down and holds the clamp arms in an open, retracted position as shown in FIG. 17. When the lower portion 508b of the trigger is pressed against an object to be clamped, the trigger slides upward relative to the rest of the device. This frees the clamp arms so that the spring pushes them out to a closed, extended position as shown in FIG. 18. On one side of the device 500, the spring is a two-phase spring design. The device 500 also includes travel stops 530 to prevent the clamp arms from falling out of the frame 501.

In other embodiments, a spring-loaded manual pull or push button trigger is used. In some embodiments, the manual trigger mechanism is similar to the force trigger 508a, but the manual trigger includes a pull tab or button incorporated into the pole or handle. In some embodiments, the trigger is intended to be pulled using a rope or wire to activate the trigger.

Figure 19B:
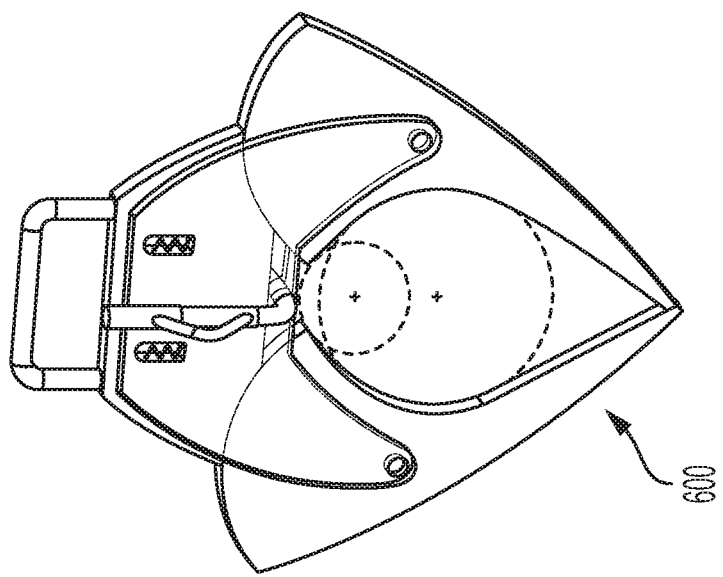
FIG. 19a and FIG. 19b show perspective views of another embodiment of the present technology.
Figure 19A:
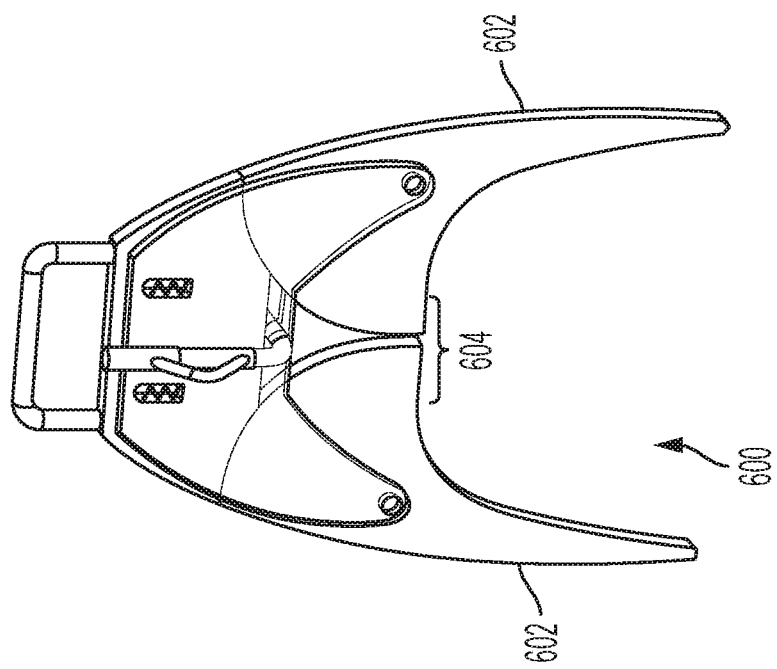

FIGS. 19a and 19b show an alternative embodiment of a device 600 according to the present technology. In this embodiment, the clamp arms 602 are shaped to include actuation surfaces 604 that are integral with each respective clamp arm. FIG. 19a shows the device 600 in an open position, and FIG. 19b shows the device 600 in a clamped or closed position. In this design, the construction of the clamp arms is simplified.

Although the present invention has been described with reference to a particular arrangement of parts, features, and the like, these are not intended to exhaust all possible arrangements or features, and indeed many other modifications and variations will be ascertainable to those of skill in the art. For example, the components and embodiments of the present invention are not limited to the size, shape, or materials shown in the drawing figures or expressed within this application, but are adaptable to a variety of sizes, shapes and materials.

What is claimed is:

1. A clamping device, comprising:
    a first clamp arm, comprising a first actuation bar and pivotable about a first pivot point and;
    a second clamp arm, positioned opposite the first clamp arm, and comprising a second actuation bar and pivotable about a second pivot point; and
    a base, relative to which the first and second clamp arms are adapted to pivot about the first and second pivot points, respectively, and that comprises at least a portion of a locking mechanism adapted to substantially restrict the first clamp arm to pivoting in a first pivot direction and to substantially restrict the second clamp arm to pivoting in a second pivot direction;
    wherein the first actuation bar is disposed between the first and second clamp arms and is adapted such that a force applied to the first actuation bar having at least a component in the first pivot direction causes the first clamp arm to pivot in the first pivot direction;
    wherein the second actuation bar is disposed between the first and second clamp arms and is adapted such that a force applied to the second actuation bar having at least a component in the second pivot direction causes the second clamp arm to pivot in the second pivot direction; and
    wherein the first clamp arm and the second clamp arm are pivotable independently of each other relative to the base.

2. The device of claim 1, further comprising that the first and second clamp arms comprise an open position and define a clamping area between them, and wherein the first and second actuation bars each extend across substantially the entire clamping area.

3. The device of claim 2, further comprising a frame to which the first and second clamp arms are pivotably mounted at the first and second pivot points respectively, and to which the base is slidably mounted such that the base is able to slide relative to the frame and the first and second clamp arms.

4. The device of claim 3, wherein the locking mechanism comprises a first ratcheting system between the base and the first clamp arm and a second ratcheting system between the base and the second clamp arm.

5. The device of claim 4, wherein the first ratcheting system comprises a first ratcheting surface on the base and a corresponding first pawl surface on the first clamp arm and the second ratcheting system comprises a second ratcheting surface on the base and a corresponding second pawl surface on the second clamp arm.

6. The device of claim 5, further comprising at least one spring biasing the base against the first and second clamp arms, wherein the spring is disposed and exerts a force between the frame and the base.

7. The device of claim 6, further comprising a first clamp spring adapted to bias the first clamp arm in the open position and a second clamp spring adapted to bias the second clamp arm in the open position.

8. A clamping device, comprising:
- a first clamp arm, comprising a first actuation bar and adapted to pivot about a first pivot point;
- a second clamp arm, comprising a second actuation bar and adapted to pivot about a second pivot point, and disposed opposite the first clamp arm such that the first and second clamp arms define a clamping area between them; and
- a base, relative to which the first and second clamp arms are adapted to pivot, and comprising at least a portion of a first locking mechanism adapted to substantially restrict the pivoting of the first clamp arm to a first pivot direction when the base is in an engaged position and at least a portion of a second locking mechanism adapted to substantially restrict the pivoting of the second clamp arm to a second pivot direction when the base is in the engaged position;
- wherein the first actuation bar is fixed relative to the first clamp arm such that a force on the first actuation bar having at least a component in the first pivot direction causes the first clamp arm to pivot in the first pivot direction;
- wherein the second actuation bar is fixed relative to the second clamp arm such that a force on the second actuation bar having at least a component in the second pivot direction causes the second clamp arm to pivot in the second pivot direction; and
- wherein the first and second clamp arms have an open position in which the first and second actuation bars extend across substantially the entire clamping area between the clamp arms.

9. The device of claim 8, wherein the first pivot point is different from the second pivot point.

10. The device of claim 8, wherein the first clamp arm and the second clamp arm are adapted to pivot independently of each other.

11. The device of claim 8, wherein the first locking mechanism is a ratcheting system comprising a first ratchet surface on the base and a corresponding first pawl surface on the first clamp arm; and
wherein the second locking mechanism is a ratcheting system comprising a second ratchet surface on the base and a corresponding second pawl surface on the second clamp arm.

12. The device of claim 11, further comprising:
a frame, comprising:
- a first mounting point to which the first clamp arm is pivotably mounted;
- a second mounting point to which the second clamp arm is pivotably mounted; and
- at least one third mounting point to which the base slideably mounted.

13. The device of claim 12, further comprising:
a first spring that biases the first clamp arm in an open position;
a second spring that biases the second clamp arm in an open position; and
at least one third spring that biases the base into the engaged position.

14. The device of claim 13, wherein the frame further comprises a stock portion adapted for mounting on a pole.

15. A clamping device, comprising:
- a first clamp arm, comprising a first actuation bar and pivotable about a first pivot point;
- a second clamp arm, positioned opposite the first clamp arm, and comprising a second actuation bar and pivotable about a second pivot point; and
- a base, relative to which the first and second clamp arms are adapted to pivot about the first and second pivot points, respectively, and that comprises at least a portion of a locking mechanism adapted to substantially restrict the first clamp arm to pivoting in a first pivot direction and to substantially restrict the second clamp arm to pivoting in a second pivot direction;
- wherein the first actuation bar is fixed with respect to the first clamp arm, is disposed between the first and second clamp arms, and is adapted such that a force applied to the first actuation bar having at least a component in the first pivot direction causes the first clamp arm to pivot in the first pivot direction;
- wherein the second actuation bar is fixed with respect to the second clamp arm, is disposed between the first and second clamp arms, and is adapted such that a force applied to the second actuation bar having at least a component in the second pivot direction causes the second clamp arm to pivot in the second pivot direction;
- wherein the first clamp arm and the second clamp arm are pivotable independently of each other relative to the base; and
- wherein the first and second clamp arm have an open position in which the first actuation bar and the second actuation bar extend across substantially the entire clamping area between the clamp arms.

16. The clamping device of claim 15, further comprising:
a frame, comprising:
- a first mounting point to which the first clamp arm is pivotably mounted;
- a second mounting point to which the second clamp arm is pivotably mounted; and
- at least one third mounting point to which the base slideably mounted.

17. The clamping device of claim 16, wherein the locking mechanism includes a first ratcheting system between the base and the first clamp arm and a second ratcheting system between the base and the second clamp arm; and wherein the first ratcheting system comprises a first ratcheting surface on the base and a corresponding first pawl surface on the first clamp arm and the second ratcheting system comprises a second ratcheting surface on the base and a corresponding first pawl surface on the second clamp arm.

18. The device of claim 17, further comprising:
a first spring that biases the first clamp arm in an open position;
a second spring that biases the second clamp arm in an open position; and
at least one third spring that biases the base into the engaged position.

* * * * *